US012657124B2

(12) United States Patent
Hinkle et al.

(10) Patent No.: US 12,657,124 B2
(45) Date of Patent: Jun. 16, 2026

(54) APPARATUS WITH STORAGE CONNECTION MECHANISM AND METHODS FOR OPERATING THE SAME

(71) Applicant: Micron Technology, Inc., Boise, ID (US)

(72) Inventors: Jonathan R. Hinkle, Raleigh, NC (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 18/641,286

(22) Filed: Apr. 19, 2024

(65) Prior Publication Data

US 2024/0378145 A1     Nov. 14, 2024

Related U.S. Application Data

(60) Provisional application No. 63/464,883, filed on May 8, 2023.

(51) Int. Cl.
*G06F 12/02* (2006.01)
*G06F 3/06* (2006.01)
*G06F 13/42* (2006.01)

(52) U.S. Cl.
CPC ........ *G06F 12/0246* (2013.01); *G06F 3/0607* (2013.01); *G06F 3/0659* (2013.01); *G06F 3/0688* (2013.01); *G06F 13/4247* (2013.01)

(58) Field of Classification Search
CPC .. G06F 12/0246; G06F 3/0607; G06F 3/0659; G06F 3/0688; G06F 13/4247
See application file for complete search history.

(56) References Cited

U.S. PATENT DOCUMENTS

| | | | | |
|---|---|---|---|---|
| 8,943,227 B2 * | 1/2015 | Klughart | ............. | G06F 13/4072 |
| | | | | 710/5 |
| 11,847,338 B2 * | 12/2023 | Golov | ..................... | G06F 3/064 |
| 2007/0011361 A1 * | 1/2007 | Okada | ................... | G06F 3/0656 |
| | | | | 710/8 |

OTHER PUBLICATIONS

U.S. Appl. No. 18/641,290—Unpublished Patent Application to Jonathan Hinkle et al., filed Apr. 19, 2024, titled "Apparatus With Chained Storage Management Mechanism and Methods for Operating the Same", 34 pages.
U.S. Appl. No. 18/641,296—Unpublished Patent Application to Jonathan Hinkle et al., filed Apr. 19, 2024, titled "Apparatus With Multi-Host Storage Connection Mechanism and Methods for Operating the Same", 37 pages.

* cited by examiner

*Primary Examiner* — Idriss N Alrobaye
*Assistant Examiner* — Richard B Franklin
(74) *Attorney, Agent, or Firm* — Dorsey & Whitney LLP

(57) ABSTRACT

Methods, apparatuses, and systems related to serially chained memory subsystems are described. The grouped set of chained subsystems may coordinate internal communications and operations across the separate subsystems within the set. Memory locations for related or connected data may be dynamically computed to be across multiple subsystems to allow for parallel processing, failure/error recovery, or the like.

15 Claims, 4 Drawing Sheets

APPARATUS WITH STORAGE CONNECTION MECHANISM AND METHODS FOR OPERATING THE SAME

CROSS-REFERENCE TO RELATED APPLICATION(S)

The present application claims priority to U.S. Provisional Patent Application No. 63/464,883, filed May 8, 2023, the disclosure of which is incorporated herein by reference in its entirety.

This application contains subject matter related to U.S. patent application Ser. No. 18/641,290, by Jonathan R. Hinkle et al., filed Apr. 19, 2024, titled "APPARATUS WITH CHAINED STORAGE MANAGEMENT MECHANISM AND METHODS FOR OPERATING THE SAME" and U.S. patent application Ser. No. 18/641,296, by Jonathan R. Hinkle et al., filed Apr. 19, 2024, titled "APPARATUS WITH MULTI-HOST STORAGE CONNECTION MECHANISM AND METHODS FOR OPERATING THE SAME." The related applications, of which the disclosures are incorporated by reference herein, are assigned to Micron Technology, Inc.

TECHNICAL FIELD

The disclosed embodiments relate to devices, and, in particular, to semiconductor memory devices with storage connection mechanisms and methods for operating the same.

BACKGROUND

The growth in computing and communication technologies is rapidly increasing the need to efficiently store and provide access to data. Such data storage is provided through memory systems that include memory devices, such as volatile memory devices, non-volatile memory devices (e.g., flash memory employing "NAND" technology or logic gates, "NOR" technology or logic gates, or a combination thereof), or a combination device.

The memory systems and/or the memory devices are connected to host devices (e.g., end-user computing device, host processors, or the like) through wired and/or wireless means. However, each connected device and system has limited communication capacities (e.g., limitations on maximum throughput, bandwidth, communication ports, communication channels, or the like) due to operating environment, cost, current state of the technologies, or other such factors. As such, the increasing demand for data storage typically corresponds to a demand for higher storage density for each memory device/system.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

As described in greater detail below, the technology disclosed herein relates to an apparatus, such as memory systems, systems with memory devices, related methods, etc., for connecting and grouping a set of memory devices or subsystems. The grouped set of devices/subsystems can be connected in series. The grouped set can include an interfacing subsystem coupled to and directly communicating with a system host. The grouped set can include a first chained subsystem (e.g., a second memory subsystem in the grouped set) directly connected to the interfacing subsystem. The first chained subsystem can be communicatively coupled to the system host through the interfacing subsystem. The grouped set can include additional subsystems that are similarly (i.e., serially) connected to the first chained subsystem and/or each other.

The devices having direct communication can operate as communication endpoints. For the direct communication, any intervening circuits or devices (e.g., repeaters, routers, or the like) may perform (1) signal processing, such as for restoring the communicated waveforms, and/or (2) restorative data processing (e.g., error corrections) in forwarding or reconveying the communicated data without altering or directly utilizing the content of the communicated data.

In some embodiments, the grouped set can operate as a single system or unit with respect to the system host. In other words, the interfacing subsystem can present the grouped set of subsystems as a singular unit to the system host, and the system host can view the grouped set of subsystems as a single memory system/device and operate accordingly. In other embodiments, each individual subsystem/device within the grouping can be viewable to the system host. The system host can identify and directly communicate with each individual subsystem/device in the grouping. The preceding devices, including the interfacing subsystem, can provide the visibility and facilitate the direct communication.

For illustrative purposes, embodiments of the present technology are described below in the context of a server system using peripheral component interconnect express (PCIe) connections between the connected components. However, it is understood that the embodiments of the present technology can be implemented in other contexts or environments, such as in an end-point computing system, mainframes, or the like. Moreover, the embodiments of the present technology can be implemented using other communication connections, such as for wireless connections, other wired communication schemes, or the like.

Figures 1A, 1B:
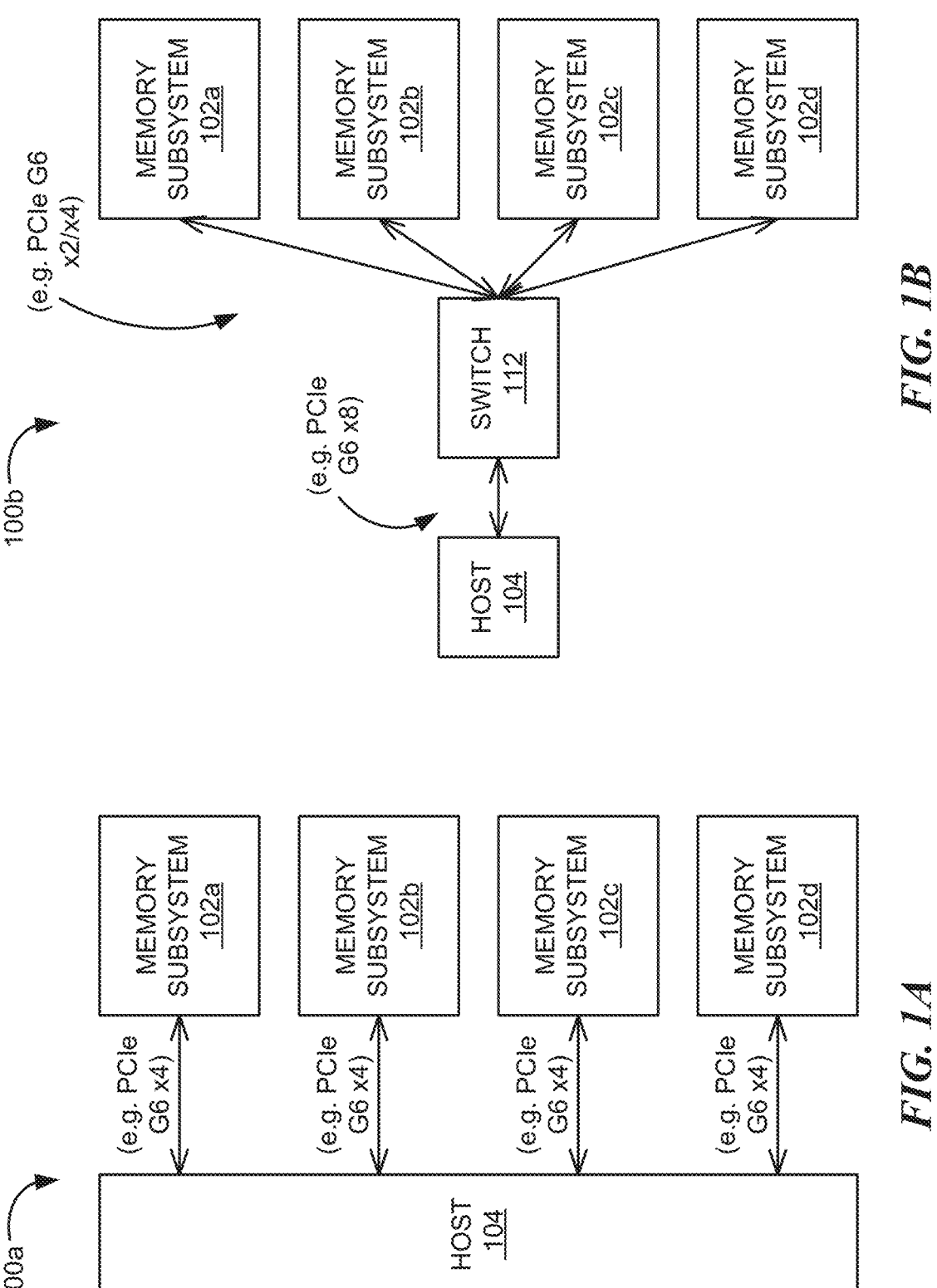
FIG. 1A and FIG. 1B are block diagrams illustrating connection schemes between a system host and memory subsystems in a computing system.

For comparative purposes, FIG. 1A and FIG. 1B are block diagrams illustrating connection schemes between a system host 104 (e.g., a system processor) and memory subsystems (e.g., memory subsystems 102a, 102b, 102c, and 102d) in a computing system (e.g., a server). Conventionally, the computing system include the system host 104 directly connected to each of the memory subsystems (e.g., memory drives, such as nonvolatile memory express (NVMe) solid-state drives (SSDs)). In other words, the memory subsystems 102a, 102b, 102c, and 102d are connected in parallel to the system host 104.

FIG. 1A illustrates a computing system 100a having a set of direct connections (e.g., without intervening devices) between the system host 104 and the parallel-connected memory subsystems 102a, 102b, 102c, and 102d. FIG. 1B illustrates a computing system 100b implementing the parallel connection through an intervening device 112 (e.g., a switch). The parallel configuration for the computing system 100b can also be called a fan-out configuration.

Referring to FIG. 1A and FIG. 1B together, the communicative connections between, the system host 104, the memory subsystems 102a, 102b, 102c, 102d, the intervening device 112, or a combination thereof can include PCIe connections. Each direct connection illustrated in FIG. 1A and FIG. 1B represents one or more lanes of PCIe G6 connections.

The connection speeds according to the number of lanes (e.g., bus width) and connecting technologies. For PCIe Generation 4.0 connections, the PCIe connection between the devices commonly include four lanes. Typically, the four-channel connection provides a maximum bandwidth performance for data transfers of about 6.4 GB/s. Later revisions of the PCIe interface may enable higher maximum bandwidth performance for four lanes, such as with PCIe Gen5 providing up to 12.8 GB/s and up to 25.6 GB/s for PCIe Gen6. Same bandwidth may be achievable with fewer lanes or smaller bus width, such as for a single lane PCIe Gen6 providing approximately 6.4 GB/s, and two lanes of PCIe Gen6 providing about 12.8 GB/s.

In contrast to the growth in the communication capacities, storage devices (e.g., NAND Flash based NVMe SSD) performance is currently failing to scale at a similar rate. As such, the currently available storage devices fail to provide the capacity/density that can fully utilize the communication capacities. Also, for highest capacity SSDs used for bulk storage capacity and for replacing some Hard Disk Drives (HDD), the performance needs are much smaller. Such devices typically require half to ⅛ of the available bandwidth per drive.

Figure 2:
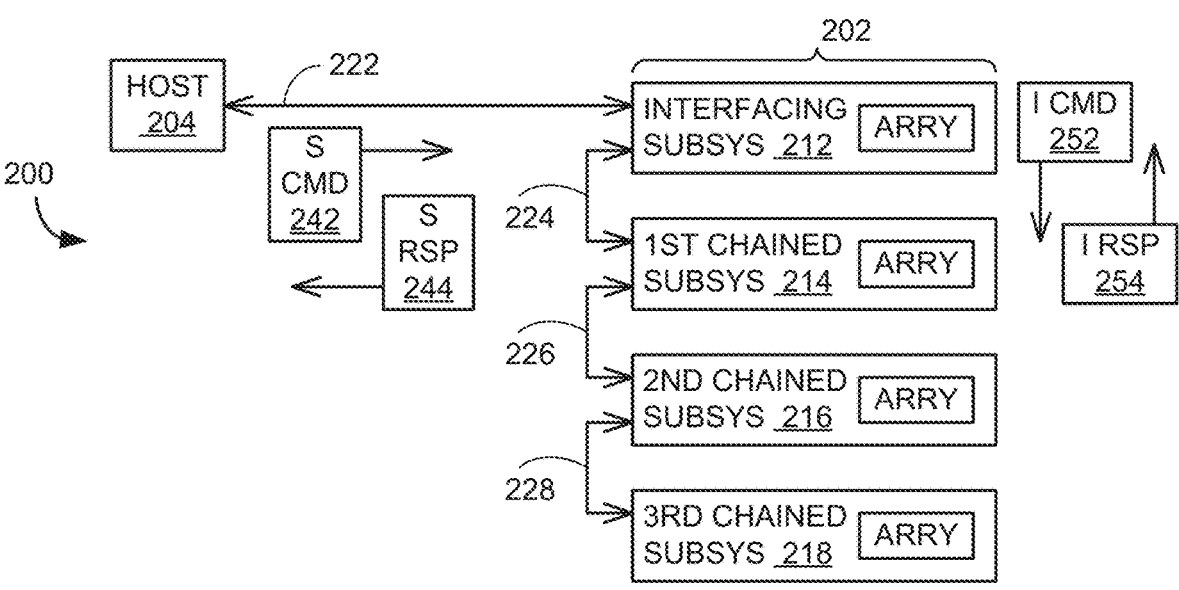
FIG. 2 is a block diagram of a computing system with chained memory subsystems in accordance with an embodiment of the present technology.

In some designs, running at higher interface speeds may reduce interconnect cost by requiring less expensive cables and routing in a system. For example, it may be more cost effective to run a two-lane (×2) PCIe Gen6 connection to each drive instead of a four-lane (×4) PCIe Gen5 connection, but it can provide the system with approximately the same bandwidth. However, the reduction in cable cost and connection complexity often requires the use of the switch 112 with additional power requirements and other related costs.
Example Topology In contrast to the conventional systems, FIG. 2 illustrates a block diagram of a computing system 200 with chained memory subsystems in accordance with an embodiment of the present technology. The computing system 100 can include a personal computing device/system, an enterprise system, a mobile device, a server system, a database system, a distributed computing system, or the like. The computing system 200 can include a system host 204 (e.g., the system host 104 of FIG. 1A/1B, such as a server CPU) connected to a serially linked grouping of memory subsystems 202 (also referred to as a "grouped set 202"). The system host 204 can include one or more processors that can write data to and/or read data from the grouped set 202 (e.g., the memory locations therein). For example, the system host 204 can include an upstream central processing unit (CPU).

The grouped set 202 can include multiple memory subsystems (e.g., storage drives, such as NVMe SSDs) that are serially connected to each other and the system host 204. For example, the grouped set 202 can include (1) an interfacing subsystem 212 that is directly connected to and/or directly communicating with the system host 204 through a host-memory connection 222 and (2) a first chained subsystem 214 that is directly connected to the interfacing subsystem 212 through a first memory-internal connection 224. The first chained subsystem 214 can be communicatively coupled to the system host 204 through the interfacing subsystem 212 over the host-memory connection 222 and the first memory-internal connection 224. In other words, the first chained subsystem 214 and the system host 204 may be without any direct communicative paths (e.g., without other potential endpoint devices) that link the devices as communication endpoints.

The grouped set 202 can include additional subsystems, such as a second chained subsystem 216, a third chained subsystem 218, and so forth, that follow the cascading topology. For example, according to the serial connection configuration, the second chained subsystem 216 can be directly connected to the first chained subsystem 216 through a second memory-internal connection 226, and the third chained subsystem 218 can be directly connected to the second chained subsystem 216 through a third memory-internal connection 228. In other words, the chained subsystems 214-218 can be configured to leverage the serial connections and communicate through the interfacing subsystem 212 in communicating with the system host 204 instead of directly communicating with the system host 204. To facilitate the communication with the chained subsystems, the interfacing subsystem 212 can logically and/or physically present the chained subsystems or the memory locations therein through the host-memory connection 222. Details regarding the facilitation of the communication is described below.

For illustrative purposes, the grouped set 202 is shown having up to four separate subsystems. However, it is understood that the grouped set 202 can include a greater number of (e.g., five or more) chained subsystems. The number of chained subsystems can vary according to a balance between targeted performance and capacity.

Each of the connections 222-228 can correspond to PCIe or other types of high-speed input-output connections. For example, the connections 222-228 can implement various generations of PCIe (e.g., Gen4, Gen5, Gen6, or greater) and include one or more lanes within each connection. The host-memory connection 222 can have a capacity (e.g., a throughput rate, a number of lanes, or the like) that is equivalent to or greater than the memory-internal connections 224-228.

In comparison to the connections illustrated in FIG. 1A, the host-memory connection 222 can be paired to a higher storage capacity. In other words, each PCIe connection/port at the system host 204 can be connected to greater storage capacities (e.g., two or more drives) than the connections/ports at the system host 104 of FIG. 1A. In comparison to the connections between the subsystems and the switch 112 illustrated in FIG. 1B, the memory-internal connections 224-228 can have equivalent or reduced capacities (e.g., earlier generation technology and/or reduced number of lanes). In some embodiments, the memory-internal connections 224-228 can have lanes that are dedicated to each subsystem, and thusly successively decreasing in the number of lanes in moving away from the interfacing subsystem 212. For the example with the grouped set 202 including four subsystems, the first memory-internal connection 224 can include 3n lanes (e.g., 3 lanes), the second memory-internal connection 226 can include a set of 2n lanes (e.g., In less than the first memory-internal connection 224, such as 2 lanes), and the third memory-internal connection 228 can include n lanes.

Accordingly, the serial connections and the cascaded configuration in the grouped set 202 can allow significant reduction of interconnect required for the host per the number of drives attached while preserving the bandwidth needed per drive, thereby leveraging the faster communication interfaces. The serial connections and the cascaded configuration in the grouped set 202 can also reduce or eliminate the need for intermediate PCIe switches which add significant cost and power to the overall computing system.

In some embodiments, the interfacing subsystem 212 can include a NVMe drive controller (e.g., a processors and/or a chained controller mechanism, described in further detail below, such as for the interfacing subsystem) having (1) a plurality of one or more lanes connected to the system host 204 and (2) a plurality of one or more lanes to a peer drive (e.g., the first chained subsystem 214). The NVMe drive controller can have or function as a PCIe root complex that hosts the subsequently chained drives. That interfacing subsystem 212 can then pass information for each of the subsequently chained drive below it to the upstream device (s) (e.g., the system host 204). The system host 204 can access the aggregate of storage devices in the chain based on the communication management function provided by the interfacing subsystem 212.

The grouped set 202 can operate as a single system or unit or as individual/separate units with respect to the system host 204. For example, the interfacing subsystem 212 can present the grouped set 202 as a singular unit to the system host 204, and the system host 204 can view the grouped set 202 a single memory system/device and operate accordingly. Effectively, the system host 204 can recognize the interfacing subsystem 212 as a representation of the grouped set 202 and view the subsequently chained subsystems or the storage locations therein logically (e.g., as extended storage locations within the collectively represented storage unit). Alternatively, each individual chained subsystem within the grouped set 202 can be viewable to the system host 204. The system host 204 can identify and directly communicate with each individual subsystem in the grouping. The preceding devices, including the interfacing subsystem 212, can function as interceding devices and facilitate the visibility and the corresponding direct communication between the endpoint devices.

In obfuscating the subsequently chained devices, the interfacing subsystem 212 can provide a representative mapping for the chained devices (e.g., the memory locations in the chained subsystems 214-218). Accordingly, the system host 204 can access a continuous set of logical block addressing (LBA) corresponding to the sum of the subsystems in the grouped set 202 (e.g., subsystems 222-228) and the corresponding storage capacities. The interfacing subsystem 212 can generate the representative mapping by addressing the storage locations according to one or more predetermined schemes. For example, the interfacing subsystem 212 can utilize a redundant array of independent disks (RAID) scheme, such as for RAID0, RAID5, RAID6, etc., to generate the representative mapping. The interfacing subsystem 212 can form stripes that extend across separate subsystems and group/sequence portions of memory locations therein. Also, the interfacing subsystem 212 can aggregate the addresses across the chained subsystems.

Additionally, the interfacing subsystem 212 can further perform additional maintenance/management functions. For example, the interfacing subsystem 212 can implement a data recovery procedure for RAID failures. Moreover, the interfacing subsystem 212 can collapse or combine data locally maintained on each subsystem (e.g., logs) into global data for the grouped set 202, such as according to NVMe or other requirements applicable to the computing system 200.

In interacting with the interfacing subsystem 212, the subsequently chained subsystems can further operate according to the system requirements (e.g., NVMe). For example, at boot time, once the interfacing subsystem 212 detects a connection or an interaction with the system host 204 (e.g., PCIe configuration calls), the interfacing subsystem 212 can configure the subsequently chained subsystems 214-218 for the chained operation.

In other embodiments, the interfacing subsystem 212 can be configured to include a switch configuration for managing communications between the system host 204 and the subsequently chained subsystems. For example, the memory drives in the grouped set 202 can pass PCIe enumeration requests for additional devices to downstream devices until there are no more devices and it has also enumerated itself. Upon start of initialization, the interfacing subsystem 212 can detect an active connection to the system host 204 and subsequently send initialization traffic to the next chained drive. The chained drives can also pass the initialization traffic until a drive detects than its down-stream port is unconnected. Such drive (e.g., the third chained subsystem 218) can identify itself as that last chained subsystem and enumerate itself accordingly. The upstream drives (e.g., the second chained subsystem 216 and then the first chained subsystem 214) can sequentially get enumerated until the interfacing subsystem 212 is also enumerated as an endpoint on the switch that it's presenting to the system host 204. Once the drives in the grouped set 202 are enumerated as end points on the switch, the system host 204 can be logically connected to all the drives in the grouped set 202.

Alternatively or additionally, the grouped set 202 can include the connections 224-228 having lanes that are effectively dedicated to one of the chained subsystems 214-218. For example, multiple PCIe lanes can be driven from the system host 204 to the interfacing subsystem 212. The interfacing subsystem 212 can use a smaller sub-set of lanes and the remaining lanes can be physically re-driven or re-timed to the subsequently connected chained subsystems 214-218. The individual drives in the grouped set 202 can be visible to the system host 204 directly, and the individual drives can be configured as end-points. In some embodiments, the upstream devices that receive communications to/from downstream devices can retransmit the received message in the continuing direction. The retransmission can be performed using dedicated lanes. For example, as described above, the first memory-internal connection 224 from the interfacing subsystem 212 can include three sets (3n) of lanes that are dedicated to the chained subsystems 214-218. The second memory-internal connection 226 can include or retain two sets of lanes that are dedicated to the chained subsystems 216 and 218. The third memory-internal connection 226 can include or retain the set of lanes dedicated to the third chained subsystem 218. Accordingly, the interceding device can retransmit the communication in the lane dedicated to the recipient drive. The system host 204 can logically view each of the drive as xn drives without the corresponding xn direct connections between the system host 204 and the chained subsystems 214-218.

As an illustrative example, the interfacing subsystem 212 can receive a system command 242, such as a PCIe enumeration command or a memory command (e.g., a write command or a read command) accompanied by a logical address. The interfacing subsystem 212 can generate an internal command 254 that corresponds to the received system command 242. When the targeted drive is downstream, the interfacing system 212 can send the generated internal command 254 to the chained subsystems. Each of the chained subsystems can reconvey the internal command 254 downstream when the receiving/reconveying drive is not the target of the internal command 254. The targeted drive can identify itself as including the physical storage location matching the targeted logical address and execute the memory command. The targeted drive can send an internal response 254 (e.g., read data, a completion status, or the like) upstream based on completing the commanded operation. The interfacing subsystem 212 can send the received result as a system response 244 to the system host 204.

For the enumeration command, the interfacing subsystem 212 can utilize the internal command 252 and the internal response 254 to convey the internal enumeration command and internal response (e.g., the identified positions of downstream devices) as described above. In some embodiments, the interfacing subsystem 212 can include a switch response in the system response 244 that combines all identified positions as separate PCIe enumerated endpoints for itself and the chained subsystems. In other words, the interfacing subsystem 212 can represent itself as both a switch and a NVMe drive and provide a response typically provided by the switch to report the drives in the grouped set 202. In other embodiments, the interfacing subsystem 212 can provide system response 244 that collectively represents the subsystems as a singular PCIe entity with logically mapped memory locations in each of the subsystems.

Figure 3:
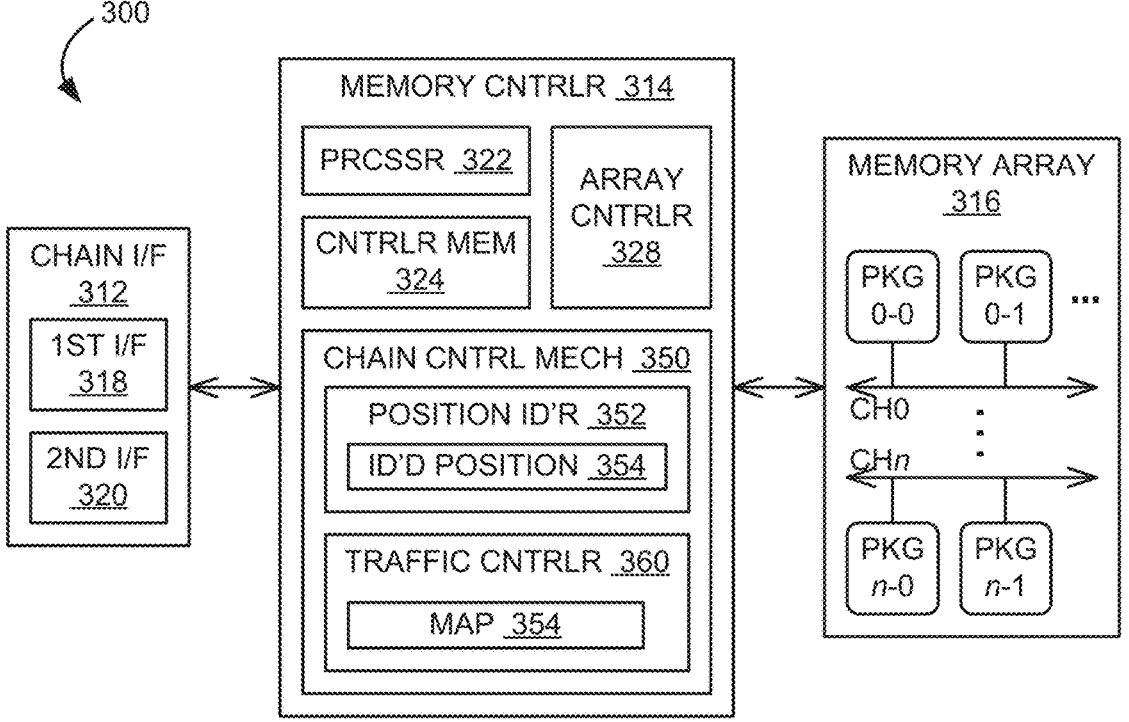
FIG. 3 is a block diagram of a memory subsystem in accordance with an embodiment of the present technology.

FIG. 3 is a block diagram of a memory system 300 in accordance with an embodiment of the present technology. coupled to a host device (e.g., the system host 204 of FIG. 2). The memory system 300 can represent the components or subsystems (e.g. NVMe drives) in the grouped set 202 of FIG. 2. Using the example illustrated in FIG. 2, the memory system 300 can represent one or more of the interfacing subsystem 212, the first chained subsystem 214, the second chained subsystem 216, and the third chained subsystem 218.

The memory system 300 can include circuitry configured to store data (via, e.g., write operations) and provide access to stored data (via, e.g., read operations). For example, the memory system 300 can include a persistent or non-volatile data storage system, such as a NAND-based Flash drive system, a Solid-State Drive (SSD) system, a NVMe drive, a SD card, or the like. In some embodiments, the memory system 300 can include a communication interface 312 (e.g., buffers, transmitters, receivers, and/or the like) configured to facilitate communications with the system host 204. For example, the communication interface 312 can be configured to support one or more host interconnect schemes, such as Universal Serial Bus (USB), Peripheral Component Interconnect (PCI), PCI Express (PCIe), Serial AT Attachment (SATA), or the like. The communication interface 312 can receive commands, addresses, data (e.g., write data), and/or other information from the system host 204.

The communication interface 312 can be configured to communicate data (e.g., read data) and/or other information to the system host 204, other chained subsystems (e.g., other subsystem(s) in the grouped set 202), or a combination thereof. For example, the communication interface 312 can include a first interface 318 and a second interface 320 (e.g., connectors, ports, communication processors, corresponding firmware/software, or a combination thereof). In some embodiments, the first interface 312 can be configured for upstream communications, and the second interface 320 can be configured for downstream communications. For the example illustrated in FIG. 2, the interfacing subsystem 212 can have the first interface connected to the system host 204 through the host-memory connection 222 of FIG. 2 and the second interface connected to the first chained subsystem 214 through the first memory-internal connection 224, of FIG. 2. The first chained subsystem 214 can have the first interface therein connected to the first memory-internal connection 224 and the second interface connected to the second memory-internal connection 226 of FIG. 2 and the second chained subsystem 216. The second chained subsystem 216 can have the first interface similarly connected to the first chained subsystem 214 and the second interface connected to the third chained subsystem 218. The last device in the grouped subset 202, such as the third chained subsystem 218, can have the first interface connected to the immediately preceding upstream device (e.g., the second chained subsystem 216) and the second interface unconnected (e.g., left open or having a dedicated plug or similar termination).

The memory system 300 can further include a memory controller 314 and a memory array 316. The memory array 316 can include memory cells that are configured to store a unit of information. The memory controller 314 can be configured to control the overall operation of the memory system 300, including the operations of the memory array 316.

In some embodiments, the memory array 316 can include a set of NAND Flash devices or packages. Each of the packages can include a set of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate a Vt of the cell. For example, a SLC can be programmed to a targeted one of two different data states, which can be represented by the binary units 1 or 0. Also, some flash memory cells can be programmed to a targeted one of more than two data states. MLCs may be programmed to any one of four data states (e.g., represented by the binary 00, 01, 10, 11) to store two bits of data. Similarly, TLCs may be programmed to one of eight (i.e., 23) data states to store three bits of data, and QLCs may be programmed to one of 16 (i.e., 24) data states to store four bits of data.

Such memory cells may be arranged in rows (e.g., each corresponding to a word line) and columns (e.g., each corresponding to a bit line). The arrangements can further correspond to different groupings for the memory cells. For example, each word line can correspond to one or more memory pages. Also, the memory array 316 can include memory blocks that each include a set of memory pages. In operation, the data can be written or otherwise programmed (e.g., erased) with regards to the various memory regions of the memory array 316, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

While the memory array 316 is described with respect to the memory cells, it is understood that the memory array 316 can include other components (not shown). For example, the memory array 316 can also include other circuit components, such as multiplexers, decoders, buffers, read/write drivers, address registers, data out/data in registers, etc., for accessing and/or programming (e.g., writing) the data and for other functionalities.

As described above, the memory controller 314 can be configured to control the operations of the memory array 316. The memory controller 314 can include a processor 322, such as a microcontroller, special purpose logic circuitry (e.g., a field programmable gate array (FPGA), an application specific integrated circuit (ASIC), etc.), or other suitable processor. The processor 322 can execute instructions encoded in hardware, firmware, and/or software (e.g., instructions stored in controller-embedded memory 324 to execute various processes, logic flows, and routines for controlling operation of the memory system 300 and/or the memory array 316.

Further, the memory controller 314 can further include an array controller 328 that controls or oversees detailed or targeted aspects of operating the memory array 316. For example, the array controller 328 can provide a communication interface between the processor 322 and the memory array 316 (e.g., the components therein). The array controller 328 can function as a multiplexer/demultiplexer, such as for handling transport of data along serial connection to flash devices in the memory array 316.

The memory controller 314, logic circuits within the memory array 316, corresponding firmware, or a combination thereof can implement a chaining control mechanism 350 configured to control and manage the serial connection and the corresponding communications between the connected devices. The chaining control mechanism 350 can be implemented using circuitry (e.g., dedicated logic, processor, or the like), software, firmware, or a combination thereof.

The chaining control mechanism 350 can include a position identifier 352 configured to identify a position of one or more devices included in the grouped subset 202. As an illustrative example, each of the subsystems in the grouped set 202 can implement the position identifier 352 to determine a number of devices preceding or following itself. The subsystems can implement the position identifier 352 following a power-on reset, an initiation command (e.g., a PCIe enumeration request), or a similar trigger. Each of the subsystems can determine and store an identified position 354 for itself as a result of implementing the position identifier 352.

As an illustrative example, in some embodiments, the interfacing subsystem 212 can identify itself based on receiving the PCIe enumeration request from the system host 204 through its first interface 318. In response to receiving the PCIe enumeration request and/or in response to a different trigger, the interfacing subsystem 212 can implement its local position identifier by generating and sending a predetermined internal position identification command through its second interface. The generated internal command can be received at the next subsequently chained subsystem through its first interface. In response, the receiving/chained subsystem can determine whether its second interface is connected or terminated. When the second interface is connected, the subsequently chained subsystem can identify itself as an intermediate subsystem and retransmit/relay the internal command through its second interface. When the second interface is unconnected or terminated accordingly, the receiving subsystem can identify itself as the last/terminal device in the grouped set 202 and store the corresponding value as the identified position 354. The terminal subsystem can generate a reply that includes its identifier (e.g., a device identifier, a lane identifier, the identified position, or the like), its storage capacity, or the like. When the return transmission is received through the second interface, the intermediate subsystem can read the identifier(s) therein to determine its identified position. Afterwards, each intermediate subsystem can append its identifier, capacity, etc. to the received response and retransmit the appended result through its first interface. Accordingly, the chained subsystems can identify themselves to the interfacing subsystem 212.

When the appended result reaches the interfacing subsystem 212, the chained control mechanism therein can map the memory regions (via, e.g., a traffic controller 360) according to the number devices in the grouped set 202. During the initialization, the traffic controller 360 of the interfacing subsystem 212 can generate a memory map 354 that ties logical addresses to available memory locations across the chained subsystems. Accordingly, the memory map 354 can provide access through the interfacing subsystem 212 to the system host 104 to available memory locations in each of the chained subsystems. For example, the memory map 354 can be generated according to a predetermined scheme (e.g., a RAID configuration, based on appending locations/addresses, etc. as described above).

For embodiments with the grouped subset 202 and/or the interfacing subsystem 212 configured to operate as a singular storage unit (e.g., one PCIe endpoint device), the interfacing subsystem 212 can provide a PCIe enumeration response that identifies itself as a representation for the singular unit. The interfacing subsystem 212 can use the identifiers and/or the capacities to generate the memory map 354, thereby effectively presenting the subsequently chained devices to the system host 204 via logical memory mapping instead of individual PCIe endpoints. For other embodiments with the subsystems in the grouped set 202 configured to operate as individual PCIe endpoints, the interfacing subsystem 212 can provide separate PCIe endpoint responses for itself and for each of the subsystems according to the received internal responses. Additionally, the interfacing subsystem 212 can further report itself as a switch. Accordingly, the grouped set 202 can present to the system host 204 the configuration 100*b* of FIG. 1B without actually including the switch 112 of FIG. 1B.

After initialization and during operation, the grouped subset 202 and the traffic controller 360 therein can route the communicated data to appropriate endpoints (e.g., the system host 204 and one of the subsystems containing the targeted data location). For example, in some embodiments, the memory-internal connections 224-228 can include lanes dedicated each of the chained subsystems as described above. In such embodiments, the traffic controller 360 can identify commands received through lanes that match/correspond to its identified position 354 and process such commands for local memory operations. For commands received through other lanes, the traffic controller 360 can retransmit or relay the same command in the same lane on its second interface.

Without the dedicated lanes, in some embodiments, the interfacing subsystem 212 can provide the memory map 354 with the chained subsystems. Each of the subsystems can locally identify the addresses that correspond to the local memory regions. The interfacing subsystem 212 and the chained subsystems 214-218 can locally evaluate the memory command and the corresponding address from the system host 204. Each subsystem can locally process the command when the command address indicates local storage region or relay/retransmit the received command through the second interface similarly as described above.

In other embodiments, the interfacing subsystem 212 can use the memory map 354 to identify the subsystem having the physical storage location matching the command/logical address. The interfacing subsystem 212 can generate an internal command and/or an internal tag added to the command that targets the identified subsystem. The internal subsystem 212 can convey the internal command/tag through its second interface. The subsequent chained subsystems can use the internal command/identifier to determine whether to locally process the memory operation or to relay the received command similarly as described above.

When the memory operation is performed locally, the performing subsystem can send a corresponding response (e.g., the read response/data, operation acknowledgement, completion status, or the like) through its first interface. Any intermediate or preceding device can receive the response through its second interface and retransmit the received response through its first interface. The interfacing subsystem 212 can similarly receive the response from downstream chained subsystem through its second interface 320 and then retransmit through the first interface 318 to the system host 204.

Figure 4:
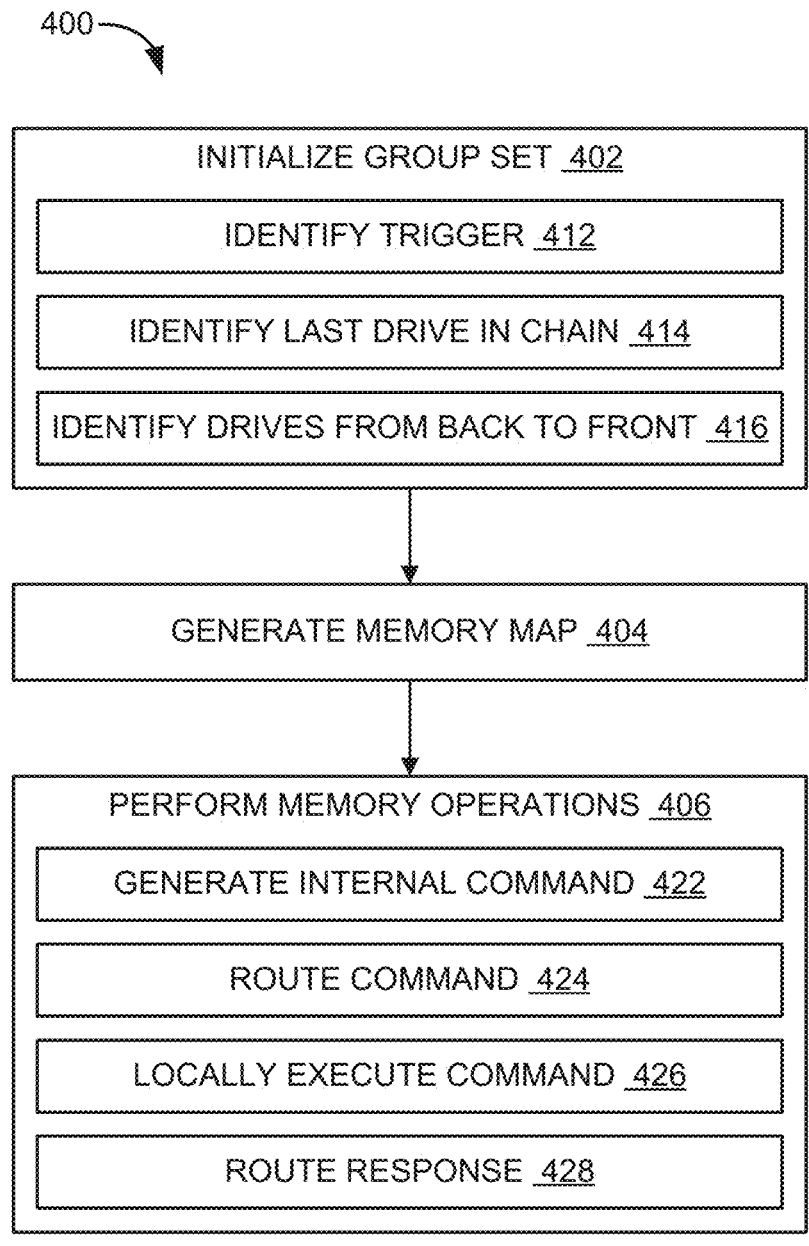
FIG. 4 is a flow diagram illustrating an example method of operating an apparatus in accordance with an embodiment of the present technology.

FIG. 4 is a flow diagram illustrating an example method 400 of operating an apparatus in accordance with an embodiment of the present technology. For example, the method 400 can be for operating a set of serially chained subsystems or drives, such as described above for the computing system 200 of FIG. 2, the grouped set 202 of FIG. 2 or one or more components therein (e.g., the interfacing subsystem 212 of FIG. 2, one or more of the chained subsystems 214-218 of FIG. 2, and/or the memory system 300 of FIG. 3).

At block 402, the grouped set 202 can initialize the drives therein to function as a serially connected unit of storage drives. In initializing, the grouped set 202 (e.g., the interfacing subsystem 212) can identify an initialization trigger as illustrated at block 412. For example, the grouped set 202 can identify the initialization trigger based on detecting a power-on reset in one or more of the included drives. Also, the grouped set 202 can identify the initialization trigger based on receiving a PCIe enumeration request at the interfacing subsystem 212 from the system host 204 of FIG. 2.

At block 414 the grouped set 202 can identify a last drive in the serially grouped set 202. For example, the interfacing subsystem 212 can generate and send an internal command to communicate the initialization process for the downstream drives. The internal command can be reconveyed until a receiving drive detects that its downstream connection is terminated, such as by leaving its second interface unconnected or connected to a termination load (e.g., a predetermined resistance value) or by other similar means (e.g., a pin or other similar physical setting).

At block 416, the grouped set 202 can identify the serially connected drives in reverse order (e.g., from back end to the front or the interfacing subsystem 212). For example, the last drive can generate a response that identifies itself. Other intervening drives can append their own identifier and pass the combined result upstream as described above. Accordingly, the interfacing subsystem 212 can receive a response that identifies the subsequently chained drives and a sequence for such drives. The responses can also include the storage capacity of each drive.

At block 404, the grouped set 202 can generate a memory map that collectively identifies the storage locations in the connected drives. For example, the interfacing subsystem 212 can generate the memory map according to a RAID configuration or by appending the memory locations of end-to-end across the separate drives.

The grouped set 202 can end the initialization by identifying itself as one unit (e.g., a single PCIe endpoint) or as a collection of endpoints as described above. The grouped set 202 can provide the combined storage capacity for reported endpoint(s).

After initialization, the grouped set 202 can provide data storage functions for the system host 204 and perform the corresponding memory operations as illustrated in block 406. For example, the grouped set 202 can write data to locations in the storage drives and read data from the storage drives.

In implementing such memory operations, the grouped set 202 can receive a system memory command from the system host 204 at the interfacing subsystem 212. In response, the interfacing subsystem 212 can compare a corresponding address to the memory map to determine a drive containing the targeted location. When the targeted location is outside of the local storage array, the interfacing subsystem 212 can generate a corresponding internal command as illustrated at block 422. The interfacing subsystem 212 can send the internal command downstream. Each of the serially chained drives can receive the internal command and determine whether the command location is within its local array. When the location is outside of the local array, the receiving drive can reconvey the command downstream, thereby routing the command as illustrated at block 424. When the location is within the local array, the receiving drive can locally execute the received command as illustrated at block 426. The executing drive can generate the response (e.g., a read data or a completion status) as a result of executing the command and pass the response upstream. The response can be used to generate a system response at the interfacing subsystem 212, thereby routing the response as illustrated at block 428.

Figure 5:
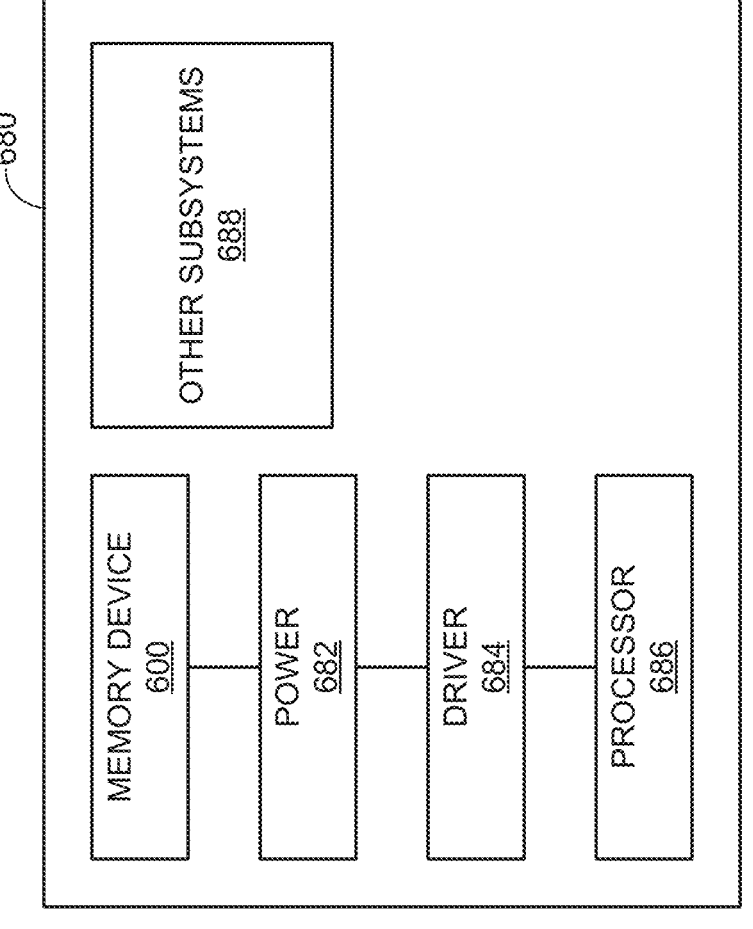
FIG. 5 is a schematic view of a system that includes an apparatus in accordance with an embodiment of the present technology.

FIG. 5 is a schematic view of a system that includes an apparatus in accordance with embodiments of the present technology. Any one of the foregoing apparatuses (e.g., memory devices) described above with reference to FIGS. 2-4 can be incorporated into any of a myriad of larger and/or more complex systems, a representative example of which is system 580 shown schematically in FIG. 5. The system 580 can include a memory device 500, a power source 582, a driver 584, a processor 586, and/or other subsystems or components 588. The memory device 500 can include features generally similar to those of the apparatus described above with reference to FIGS. 2-4, and can therefore include various features for performing a direct read request from a host device. The resulting system 580 can perform any of a wide variety of functions, such as memory storage, data processing, and/or other suitable functions. Accordingly, representative systems 580 can include, without limitation, hand-held devices (e.g., mobile phones, tablets, digital readers, and digital audio players), computers, vehicles, appliances and other products. Components of the system 580 may be housed in a single unit or distributed over multiple, interconnected units (e.g., through a communications network). The components of the system 580 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 2-5.

We claim:

1. A memory system, comprising:
   a first chained memory subsystem including a chained memory array for locally storing data at the chained memory subsystem;
   N−2 number of chained memory subsystems communicatively connected in series with each other and the first chained subsystem, wherein the N−2 number of chained memory subsystem includes at least a second chained subsystem, wherein N is at least 3;
   an interfacing subsystem (1) separate from and communicatively connected in series to the chained memory subsystem and (2) including an interfacing local array for locally storing separate data at the interfacing subsystem, wherein the interfacing subsystem is configured to:
      directly communicate with a system host for coupling the interfacing local array and the system host, wherein the direct communication with the system host is through m number of lanes; and
      facilitate communication between the system host and the chained memory subsystem for coupling the chained memory array and the system host; and
   N−1 number of memory-internal connections, wherein each connection in the set is disposed between and communicatively connecting a corresponding pair of memory subsystems in the set thereof and/or the interfacing subsystem,
   wherein the N−1 number of memory-internal connections includes at least (1) a first connection between the interfacing subsystem and the first chained subsystem and (2) a second connection between the first chained subsystem and the second chained subsystem,
   wherein each of the subsystems in the first chained subsystem and the N−2 number of chained memory subsystems correspond to a designated set of i internal lanes, and
   wherein the N−1 number of memory-internal connections include successively i less number of lanes along direct serial connections, wherein the first connection includes m-i number of lanes and the second connection includes m−2i number of lanes.

2. The memory system of claim 1, wherein the chained memory subsystem and the interfacing subsystem are separately encased memory drives that include non-volatile memory.

3. The memory system of claim 2, wherein the chained memory subsystem and the interfacing subsystem are both Non-Volatile Memory Express (NVMe) storage drives.

4. The memory system of claim 2, wherein the chained memory subsystem and the interfacing subsystem are directly connected to each other using a Peripheral Component Interconnect Express (PCIe) connection.

5. The memory system of claim 1, wherein:
   the chained memory subsystem is (1) communicatively coupled to the system host through the interfacing subsystem and (2) configured to enumerate itself as an endpoint device for identification by the system host, wherein communications for the enumeration is exchanged with the system host through the interfacing subsystem; and
   the interfacing subsystem is configured to (1) enumerate itself as a separate PCe endpoint device for identification by the system host and (2) communicate with the system host directly.

6. The memory system of claim 5, wherein the interfacing subsystem is configured to re-drive communications to the system host or the chained memory according to an identifier associated with the separately enumerated chained memory subsystem.

7. The memory system of claim 1, wherein the interfacing subsystem is configured to:
   interact with the system host to represent the interfacing subsystem and the chained memory subsystem as a single endpoint device; and
   generate a memory map for identifying and for continuously and logically addressing storage locations in the chained memory array and the interfacing local array for access by the system host.

8. The memory system of claim 7, wherein the memory map includes stripes that extend across two or more separate subsystems.

9. The memory system of claim 7, wherein interfacing subsystem is configured to generate the memory map based on sequentially concatenating addresses across the chained memory array and the interfacing local array.

10. The memory system of claim 7, wherein:

the interfacing subsystem is configured to receive a write command from the system host for a unit of memory; and the memory map is configured to store different portions of the unit of memory across the chained memory array and the interfacing local array.

11. The memory system of claim 1, wherein each connection in the N−1 number of memory-internal connections includes I number of lanes.

12. The memory system of claim 1, wherein each of the subsystems in the first chained subsystem and the N−2 number of chained memory subsystems are configured to re-drive communications received outside of the designated set of i internal lanes.

13. A Non-Volatile Memory Express (NVMe) drive, comprising:

a local array for storing data;

a logic circuit coupled to the local array;

embedded memory including instructions that, when executed by the logic circuit, causes the logic circuit to selectively operate the NVMe drive as either (1) an interfacing drive configured to be disposed between a system host and a chained drive and to facilitate access to data stored on the chained drive or (2) the chained drive configured to provide access to the local array through an upstream drive;

an upstream interface configured to communicatively couple the NVMe drive to an upstream device, wherein the upstream device is (1) a system host when the NVMe drive is operating as the interfacing drive or (2) the upstream drive when the NVMe drive is operating as the chained drive, wherein the upstream interface includes m number of ports that correspond to (1) a number of ports used to communicate with the system host and (2) a maximum number of ports for a set of serially connected memory devices; and a downstream interface configured to communicatively couple the NVMe drive to the chained drive when the NVMe drive is operating as the interfacing drive, wherein the downstream interface includes m−i number of ports according to a connection pattern that uses successively i less number of lanes to connect adjacent pair of devices moving downstream the set of serially connected memory devices.

14. The NVMe drive of claim 13, wherein the embedded memory includes the instructions that, when executed by the logic circuit, further causes the logic circuit to identify a sequential identifier for the NVMe within a serially connected set of drives, wherein the sequential identifier is computed based on a communication received from the system host through the upstream interface, a load detected at the downstream interface, a communication received from another drive through the upstream interface or the downstream interface, or a combination thereof.

15. The NVMe drive of claim 14, wherein the embedded memory includes the instructions that, when executed by the logic circuit, further causes the logic circuit to:

receive a communication associated with a message identifier through one of the upstream interface and the downstream interface; and re-send the communication through other of the upstream interface and the downstream interface when the message identifier is different from the sequential identifier.

* * * * *